US008115880B2

(12) United States Patent
Hagino

(10) Patent No.: US 8,115,880 B2
(45) Date of Patent: Feb. 14, 2012

(54) LIQUID CRYSTAL DISPLAY PANEL AND DISPLAY APPARATUS

(75) Inventor: Shuji Hagino, Miao-Li County (TW)

(73) Assignee: Chimei Innolux Corporation, Miao-Li County (TW)

( * ) Notice: Subject to any disclaimer, the term of this patent is extended or adjusted under 35 U.S.C. 154(b) by 425 days.

(21) Appl. No.: 12/426,420

(22) Filed: Apr. 20, 2009

(65) Prior Publication Data

US 2009/0268115 A1 Oct. 29, 2009

(30) Foreign Application Priority Data

Apr. 25, 2008 (JP) ................................ 2008-114873

(51) Int. Cl.
*G02F 1/1343* (2006.01)

(52) U.S. Cl. ........................................................ 349/39

(58) Field of Classification Search ........................ None
See application file for complete search history.

(56) References Cited

U.S. PATENT DOCUMENTS 7,205,969 B2 * 4/2007 Song ................................ 345/87
7,286,125 B2 * 10/2007 Morita .......................... 345/211
7,916,134 B2 * 3/2011 Morita .......................... 345/212
2006/0092111 A1 * 5/2006 Nakao et al. .................... 345/87
2009/0322660 A1 * 12/2009 Chung et al. .................... 345/87
2010/0134460 A1 * 6/2010 Hashimoto .................. 345/211

FOREIGN PATENT DOCUMENTS

JP 11-119743 A 4/1999
JP 2000-330518 A 11/2000
JP 2003-108100 A 4/2003

* cited by examiner

*Primary Examiner* — Sung Pak
(74) *Attorney, Agent, or Firm* — Birch, Stewart, Kolasch & Birch, LLP

(57) ABSTRACT

A liquid crystal display (LCD) panel includes a first substrate, a second substrate, a common electrode driving circuit and a reverse gain circuit. A storage capacitor electrode is disposed on the first substrate. A common electrode is disposed on the second substrate which is disposed oppositely to the first substrate. The common electrode driving circuit is electrically connected with the common electrode and outputs a common voltage level signal to the common electrode. The reverse gain circuit is electrically connected to the storage capacitor electrode through a connecting terminal and outputs a reverse gain voltage signal to the common electrode according to a voltage signal of the storage capacitor electrode.

11 Claims, 10 Drawing Sheets

LIQUID CRYSTAL DISPLAY PANEL AND DISPLAY APPARATUS

CROSS REFERENCE TO RELATED APPLICATIONS

This Non-provisional application claims priority under 35 U.S.C. §119(a) on Patent Application No(s). 2008-114873 filed in Japan on Apr. 25, 2008, the entire contents of which are hereby incorporated by reference.

BACKGROUND OF THE INVENTION

1. Field of Invention

The invention relates to a liquid crystal display (LCD) panel and a display apparatus.

2. Related Art

According to the development of the LCD technology, which has the advantages of light and non-radiation, the LCD apparatus has been widely applied to various kinds of electronic products to replace the traditional CRT (cathode ray tube) display apparatus. The LCD panel includes a TFT (thin-film transistor) substrate, a CF (color filter) substrate and a liquid crystal layer, which is disposed between the TFT substrate and the CF substrate. The TFT substrate has a storage capacitor electrode and a plurality of pixel unit, and the CF substrate has a common electrode.

FIG. 1A is a schematic illustration showing a portion of the conventional TFT substrate B, and FIG. 1B is a schematic illustration showing an equivalent circuit of the conventional LCD panel. As shown in FIG. 1A, each pixel unit 11 of the TFT substrate B includes a switching element 111 and a pixel electrode 112. As shown in FIGS. 1A and 1B, the pixel electrode 112 and the storage capacitor electrode 12 form a storage capacitance Cs. The pixel electrode 112 and the common electrode 13 of the CF substrate (not shown) form a liquid crystal capacitance Clc. The switching elements 111 are electrically connected to the data lines $D_i$, $D_{i+1}$ and the scan lines $S_j$, $S_{j+1}$. The storage capacitor electrode 12 and the common electrode 13 are electrically connected to a storage capacitor electrode driving circuit 14 and a common electrode driving circuit 15, respectively.

When the switching element 111 is turned on by the scan signal $Sg_j$ transmitted through the scan line $S_j$, the image voltage signal $Vg_i$ can be written into the pixel electrode 112 of each pixel unit 11 through the data line $D_i$. At the same time, the storage capacitor electrode driving circuit 14 outputs a storage capacitor voltage level signal Vs to the storage capacitor electrode 12, and the common electrode driving circuit 15 outputs a common voltage level signal Vcom to the common electrode 13, thereby maintaining the storage capacitor electrode 12 and the common electrode 13 at a constant voltage value or a preset AC voltage.

FIG. 1C is a schematic illustration showing the variations of the conventional storage capacitor voltage level signal Vs and common voltage level signal Vcom when the image voltage signal $Vg_i$ is written. As shown in FIGS. 1B and 1C, the voltage of the data line $D_i$ is changed during the period that the image voltage signal $Vg_i$ is written into the data line $D_i$. The voltage change of the data line $D_i$ can make the pixel electrode 112, the storage capacitor electrode 12 and the common electrode 13 generate voltage variation through the capacitance coupling effect. Herein, the voltage variation of the storage capacitor voltage level signal Vs is represented by the symbol Vd2. In addition, the image voltage signal $Vg_i$ is written into the pixel unit 11 on the same scan line $S_j$ through the data line $D_i$. Thus, the storage voltage level signal Vs and the common voltage level signal Vcom of the storage capacitor electrode 12 and the common electrode 13 on the same scan line $S_j$ can generate voltage variation through the capacitance coupling effect, which can make the pixel electrode voltage generate voltage variation. Then, the voltage variation Vd1 of the storage voltage level signal Vs may exist, which leads to the lateral crosstalk issue of the display screen on the LCD panel 1.

Therefore, it is an important subject to provide an LCD panel that can improve the lateral crosstalk issue.

SUMMARY OF THE INVENTION

In view of the foregoing, the invention is to provide an LCD panel that can improve the lateral crosstalk issue.

To achieve the above, the invention discloses an LCD panel including a first substrate, a second substrate, a common electrode driving circuit and a reverse gain circuit. The first substrate includes a storage capacitor electrode, and the second substrate, which is disposed oppositely to the first substrate, includes a common electrode. The common electrode driving circuit is electrically connected with the common electrode and outputs a common voltage level signal to the common electrode. The reverse gain circuit is electrically connected to the storage capacitor electrode through a connecting terminal and outputs a reverse gain voltage signal to the common electrode according to a voltage signal of the storage capacitor electrode.

In addition, the invention further discloses an LCD panel including a first substrate, a second substrate, a storage capacitor electrode driving circuit and a reverse gain circuit. The first substrate includes a storage capacitor electrode, and the second substrate, which is disposed oppositely to the first substrate, includes a common electrode. The storage capacitor electrode driving circuit is electrically connected with the storage capacitor electrode and outputs a storage capacitor voltage level signal to the storage capacitor electrode. The reverse gain circuit is electrically connected to the storage capacitor electrode through a connecting terminal and outputs a reverse gain voltage signal to the storage capacitor electrode according to a voltage signal of the storage capacitor electrode.

Furthermore, the invention also discloses an LCD panel including a first substrate, a second substrate, a storage capacitor electrode driving circuit and a reverse gain circuit. The first substrate includes a storage capacitor electrode, and the second substrate, which is disposed oppositely to the first substrate, includes a common electrode. The storage capacitor electrode driving circuit outputs a storage capacitor voltage level signal to the storage capacitor electrode. The reverse gain circuit is electrically connected to the common electrode through a connecting terminal and outputs a reverse gain voltage signal to the storage capacitor electrode according to a voltage signal of the common electrode.

To achieve the above, the invention also discloses a display apparatus including a display panel and an input unit. The display panel includes a first substrate, a second substrate, a common electrode driving circuit and a reverse gain circuit. The first substrate includes a storage capacitor electrode, and the second substrate, which is disposed oppositely to the first substrate, includes a common electrode. The common electrode driving circuit is electrically connected with the common electrode and outputs a common voltage level signal to the common electrode. The reverse gain circuit is electrically connected to the storage capacitor electrode through a connecting terminal and outputs a reverse gain voltage signal to the common electrode according to a voltage signal of the storage capacitor electrode. The input unit is coupled to the display panel for transmitting signals to the display panel for control the display panel to display image.

As mentioned above, the LCD panel of the invention has a reverse gain circuit electrically connected to the storage capacitor electrode. The reverse gain circuit can output a reverse gain voltage signal to the common electrode according to the voltage signal of the storage capacitor electrode so as to compensate the voltage variation of the common voltage level signal. The reverse gain voltage signal can not only compensate the voltage variation of the common voltage level signal, but also indirectly compensate the voltage variation of the storage capacitor voltage level signal.

In addition, the reverse gain circuit can output the reverse gain voltage signal to the storage capacitor electrode to compensate the voltage variation of the storage capacitor voltage level signal. Similarly, the reverse gain voltage signal can not only compensate the voltage variation of the storage capacitor voltage level signal, but also indirectly compensate the voltage variation of the common voltage level signal.

Furthermore, the reverse gain circuit can be electrically connected to the common electrode and output the reverse gain voltage signal to the storage capacitor electrode according to a voltage signal of the common electrode so as to compensate the voltage variation of the storage capacitor voltage level signal. The reverse gain voltage signal can not only compensate the voltage variation of the storage capacitor voltage level signal, but also indirectly compensate the voltage variation of the common voltage level signal.

Accordingly, the voltage variations of the common electrode and the storage capacitor electrode, which are caused by the writing of the image voltage signal, can be compensated by the reverse gain circuit. Thus, the lateral crosstalk issue of the LCD panel, which is caused by the voltage variations of the common electrode and the storage capacitor electrode, can be improved.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

First Embodiment

Figure 1A:
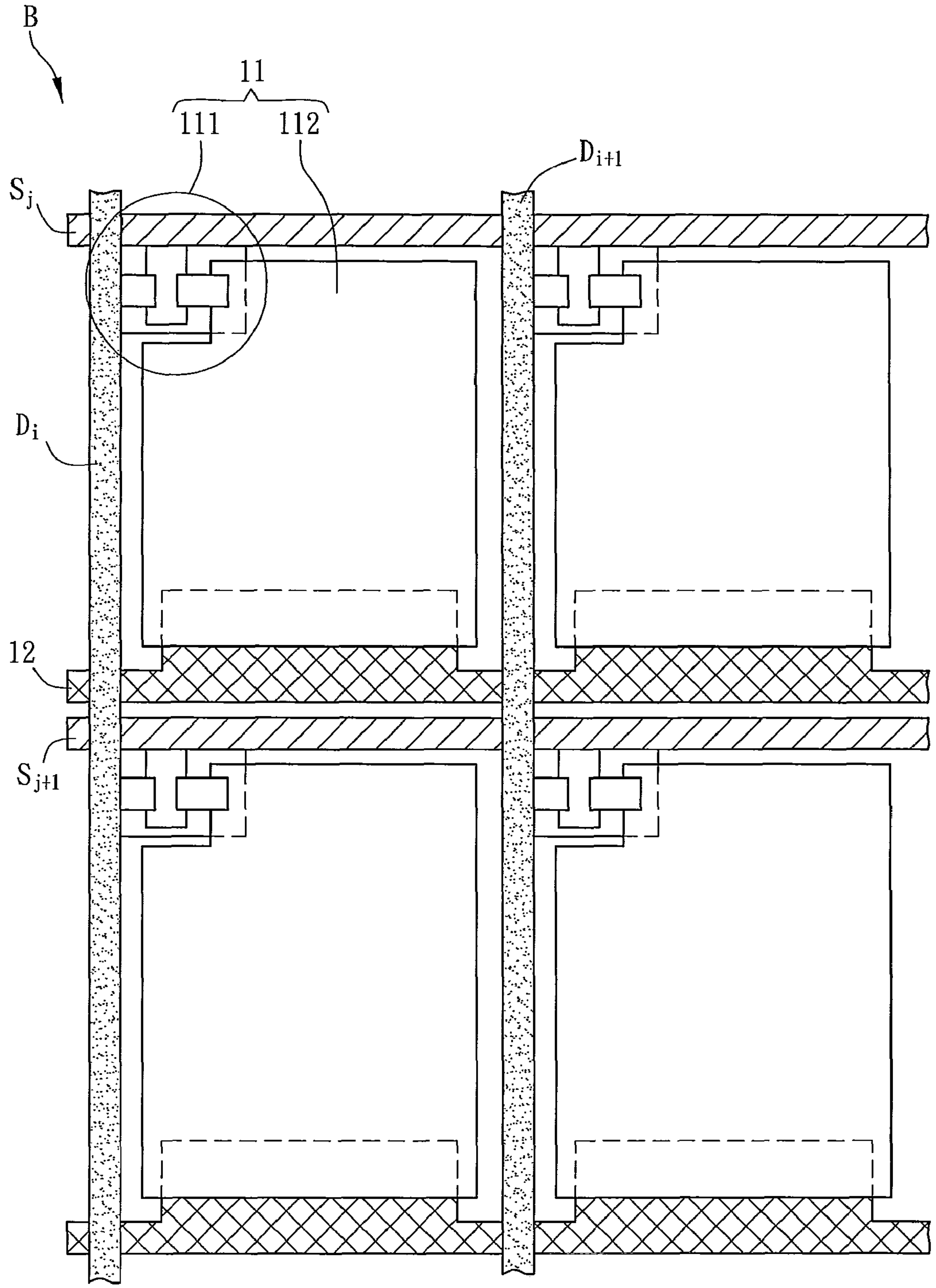
FIG. 1A(PRIOR ART)
FIG. 1A is a schematic illustration showing a portion of the conventional TFT substrate.
Figure 1B:
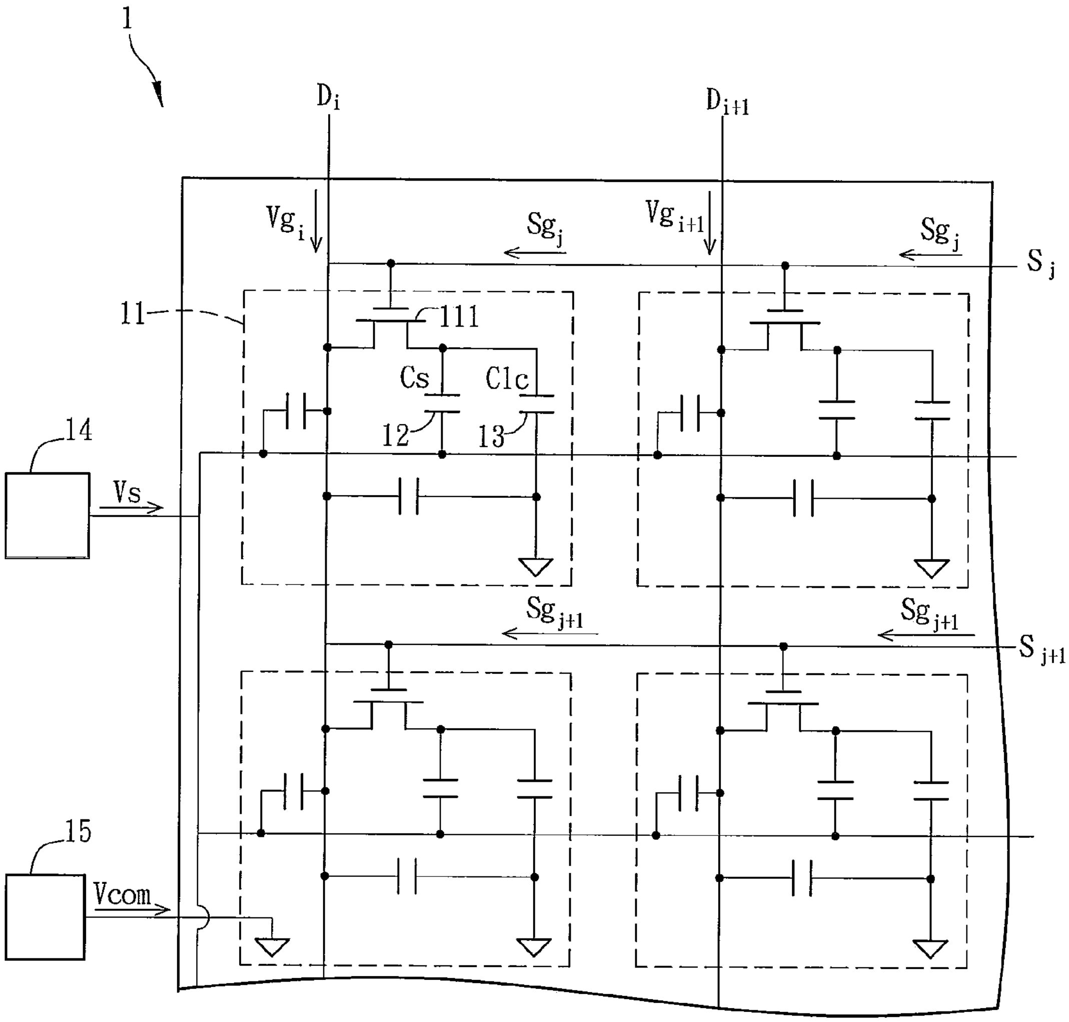
FIG. 1B(PRIOR ART)
FIG. 1B is a schematic illustration showing an equivalent circuit of the conventional LCD panel.
Figure 1C:
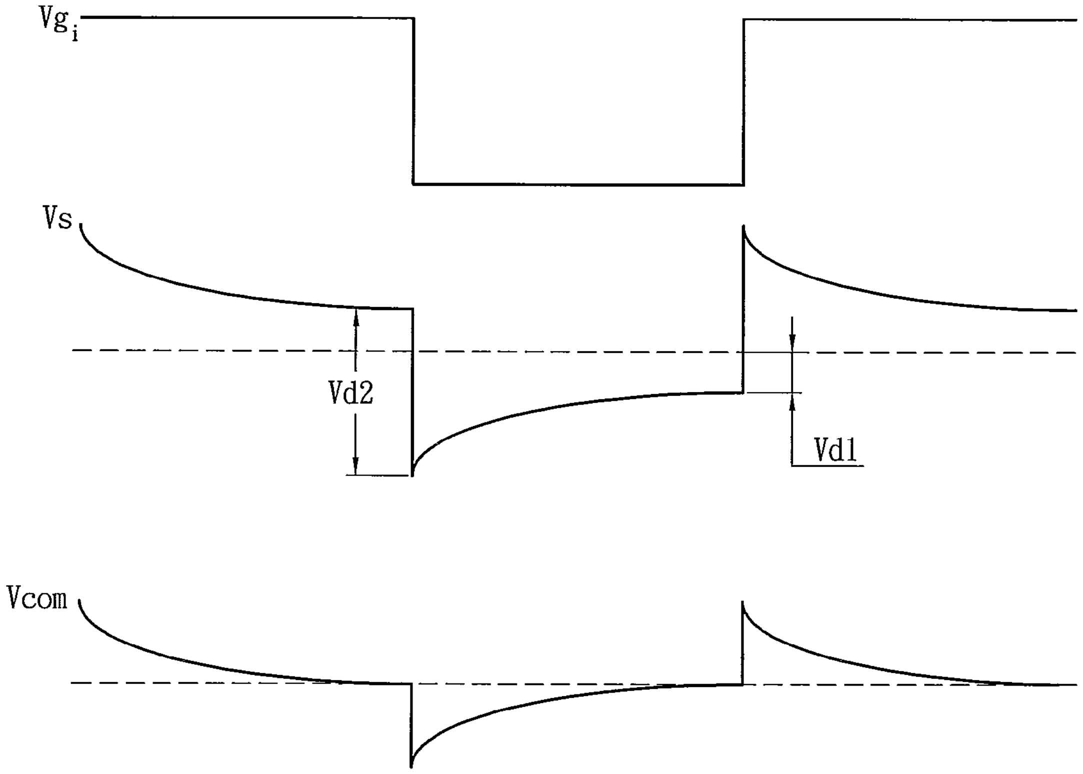
FIG. 1C(PRIOR ART)
FIG. 1C is a signal waveform illustration showing the variations of the conventional storage capacitor voltage level signal and common voltage level signal when the image voltage signal is written.
Figure 2A:
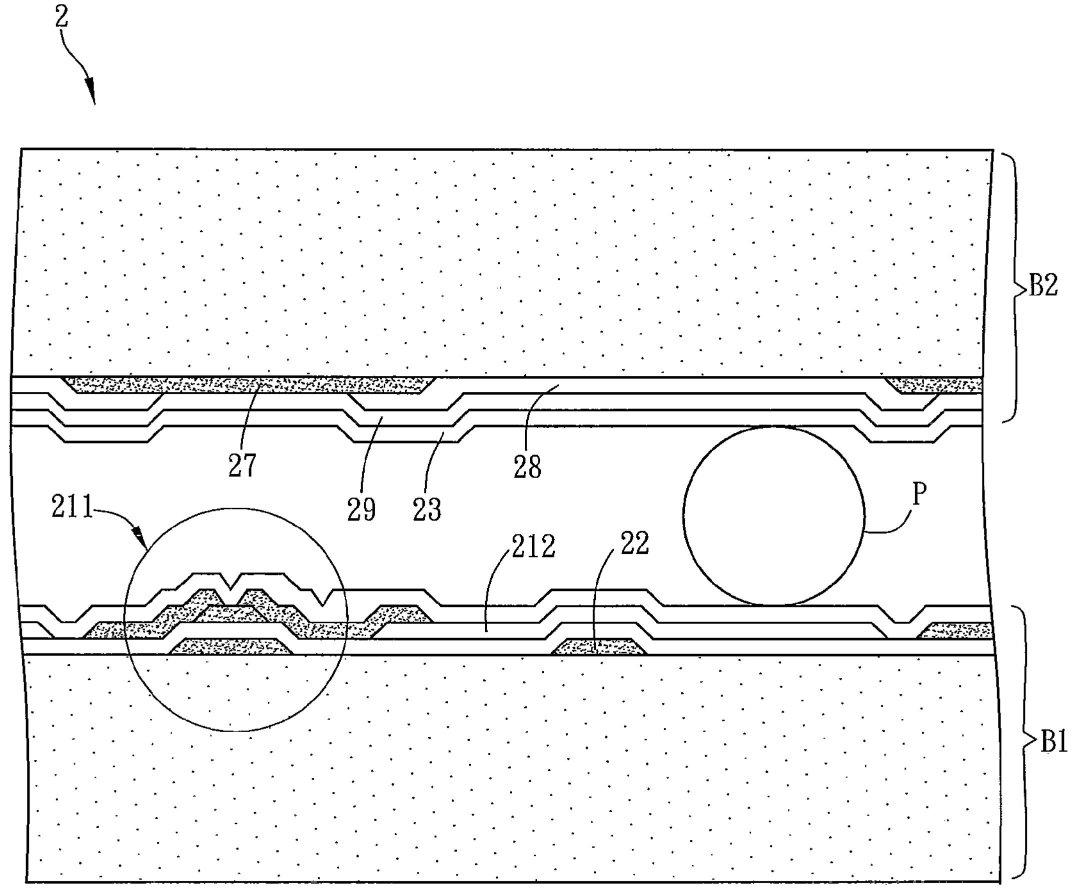
FIG. 2A is a sectional view of an LCD panel according to a first embodiment of the invention.
Figure 2B:
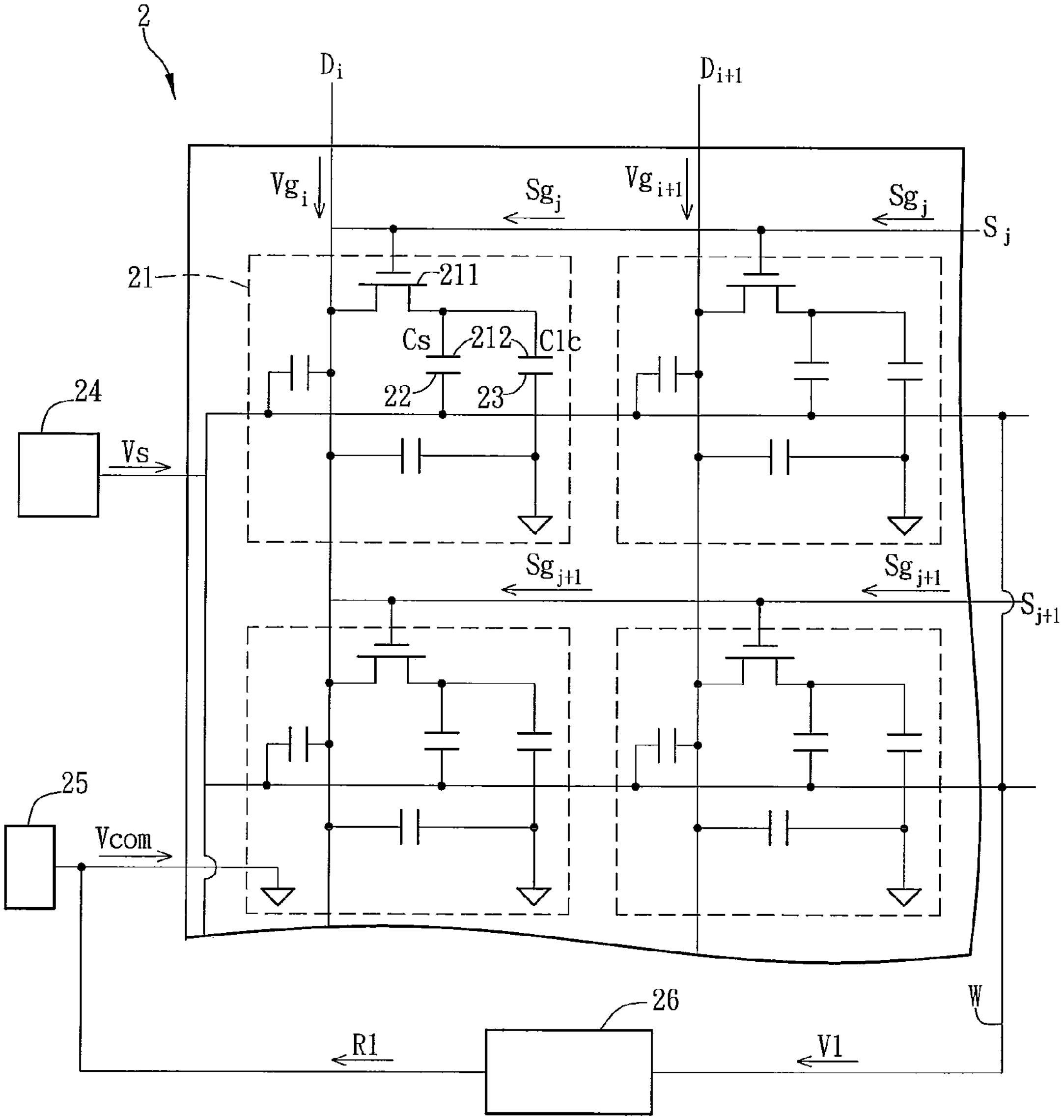
FIG. 2B is a schematic illustration of an equivalent circuit of the LCD panel according to the first embodiment of the invention.

FIG. 2A is a sectional view of an LCD panel 2 according to a first embodiment of the invention, and FIG. 2B is a schematic illustration of an equivalent circuit of the LCD panel 2. With reference to FIGS. 2A and 2B, the LCD panel 2 includes a first substrate B1, a second substrate B2, a common electrode driving circuit 25 and a reverse gain circuit 26.

As shown in FIGS. 2A and 2B, the first substrate B1 is, for example, a TFT substrate, which includes a storage capacitor electrode 22. The first substrate B1 has a plurality of pixel units 21. Each pixel unit 21 includes a switching element 211 and a pixel electrode 212, which are electrically connected with each other. The switching elements 211 are further electrically connected to the data lines $D_i$, $D_{i+1}$ and the scan lines $S_j$, $S_{j+1}$, respectively. The pixel electrode 212 and the storage capacitor electrode 22 form a storage capacitance Cs. In the embodiment, the switching element 211 is, for example, a thin-film transistor. The source of the switching element 211 is electrically connected with the data line $D_i$ or $D_{i+1}$, the gate thereof is electrically connected with the scan line $S_j$ or $S_{j+1}$, and the drain thereof is electrically connected with the pixel electrode 212.

The second substrate B2 is, for example, a CF substrate, which has a common electrode 23 and is disposed oppositely to the first substrate B1. The common electrode 23 and the pixel electrode 212 form a liquid crystal capacitance Clc. In addition, the second substrate B2 further includes a black matrix layer 27, a color filter layer 28 and an insulation layer 29. A spacer P is disposed between the first substrate B1 and a second substrate B2.

The common electrode driving circuit 25 is electrically connected to the common electrode 23 and outputs a common voltage level signal Vcom to the common electrode 23.

The reverse gain circuit 26 is electrically connected to the storage capacitor electrode 22 through a connecting terminal. The connecting terminal can be a monitoring terminal or a wire. In the embodiment, the connecting terminal is a wire W for example.

In addition, the LCD panel 2 further includes a storage capacitor electrode driving circuit 24, which is electrically connected to the storage capacitor electrode 22 and outputs a storage capacitor voltage level signal Vs to the storage capacitor electrode 22.

As mentioned above, the storage capacitor electrode 22 and the common electrode 23 are respectively driven by the storage capacitor voltage level signal Vs and the common voltage level signal Vcom, which are inputted from the storage capacitor electrode driving circuit 24 and the common electrode driving circuit 25, respectively. Thus, the storage capacitor electrode 22 and the common electrode 23 can be maintained at a constant voltage value or a preset AC voltage.

When the switching element 211 is turned on by the scan signal $Sg_j$ transmitted through the scan line $S_j$, the image voltage signal $Vg_i$ can be written into the pixel electrode 212 of the pixel unit 21 through the data line $D_i$.

Figure 2C:
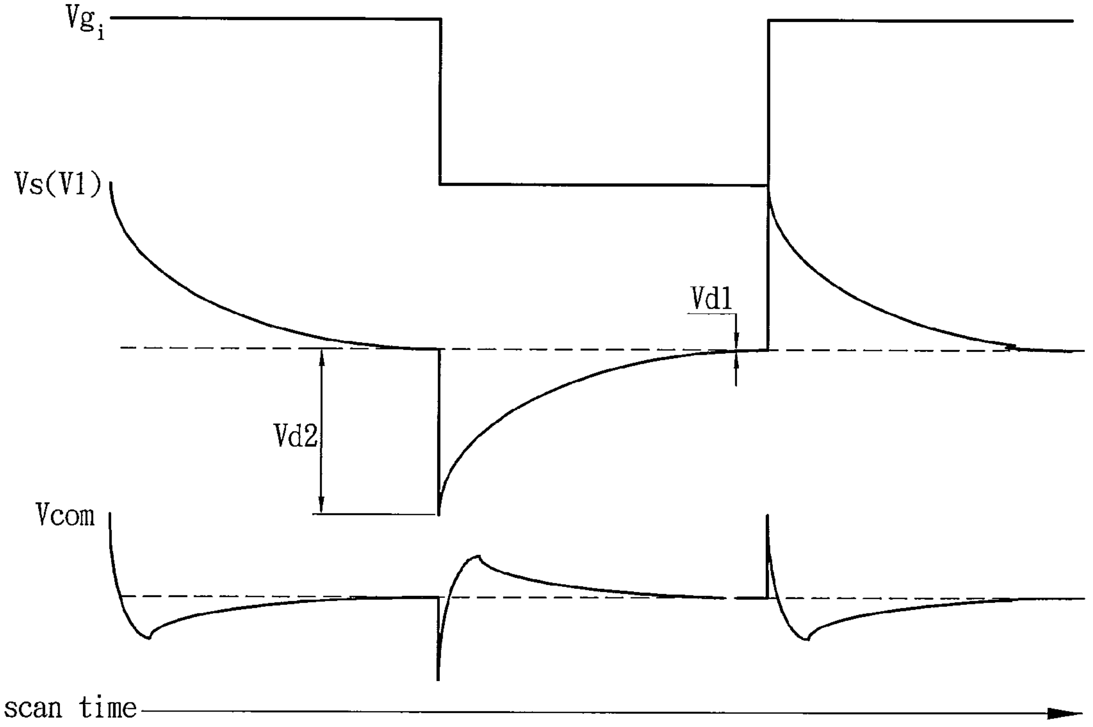
FIG. 2C is a signal waveform illustration showing the variations of the storage capacitor voltage level signal and common voltage level signal of the invention.

FIG. 2C is a schematic illustration showing the variations of the storage capacitor voltage level signal and common voltage level signal of the invention. Referring to FIGS. 2B and 2C, the reverse gain circuit 26 can detect the voltage signal V1 (Vs) of the storage capacitor electrode 22. When the voltage variation of the voltage signal V1 (Vs), such as Vd2 as shown in FIG. 2C, is generated according to the capacitance coupling effect between the data line $D_i$ and the storage capacitor electrode 22, the reverse gain circuit 26 can output a reverse gain voltage signal R1 with respect to the voltage variation. For example, if the voltage variation is −0.3V, the reverse gain circuit 26 can make a calculation with respect to the voltage variation as:

$$-(-0.3)\times G=0.3G$$

The reverse gain circuit 26 firstly reverses the sign of the voltage variation and then multiplies the reversed voltage variation with a gain G. The gain G can be between 1 and 100. In the embodiment, the gain G is, for example but not limited to, 10. Thus, the reverse gain circuit 26 outputs the reverse gain voltage signal R1 of 3V to the common electrode 23 so as to compensate the voltage variation of the common voltage level signal Vcom of the common electrode 23.

By compensating the common voltage level signal Vcom, the voltage variation of the storage capacitor voltage level signal Vs of the storage capacitor electrode 22 can also be compensated (Vd1 approaches 0) due to the electric charge transmission between the liquid crystal capacitance Clc and the storage capacitance Cs. Accordingly, the lateral crosstalk issue of the LCD panel 2 caused by the voltage variations of the storage capacitor electrode 22 and the common electrode 23 can be improved.

Figure 3:
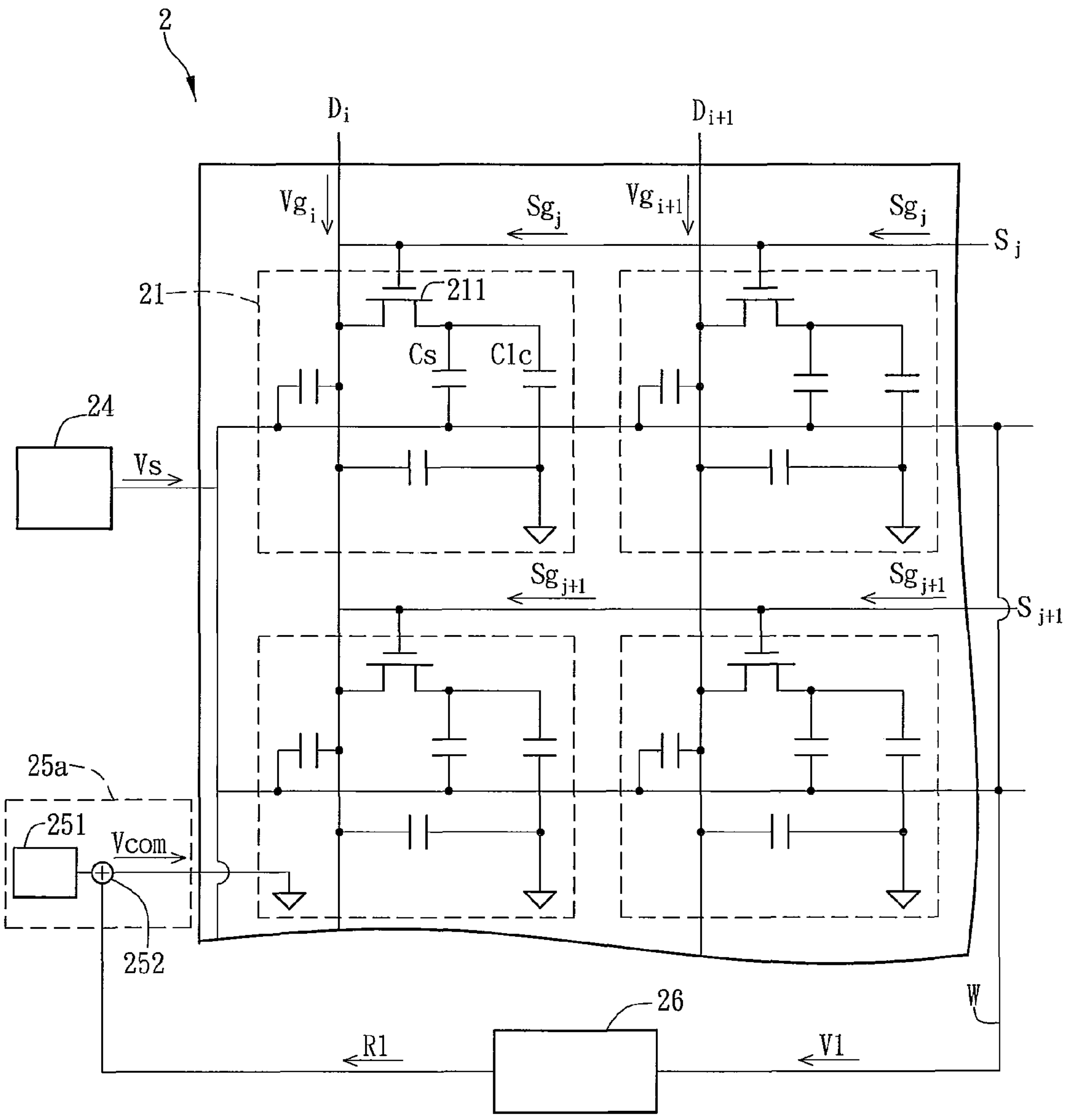
FIG. 3 is a schematic illustration of an equivalent circuit of another LCD panel according to the first embodiment of the invention.

FIG. 3 is a schematic illustration of an equivalent circuit of another LCD panel, which includes another common electrode driving circuit 25*a*, according to the first embodiment of the invention. With reference to FIG. 3, the common electrode driving circuit 25*a* includes a common electrode driving unit 251 and an adder 252. The adder 252 is electrically connected to the common electrode driving unit 251 and the reverse gain circuit 26. The adder 252 can adjust the common voltage level signal Vcom according to the reverse gain voltage signal R1.

Second Embodiment

Figure 4:
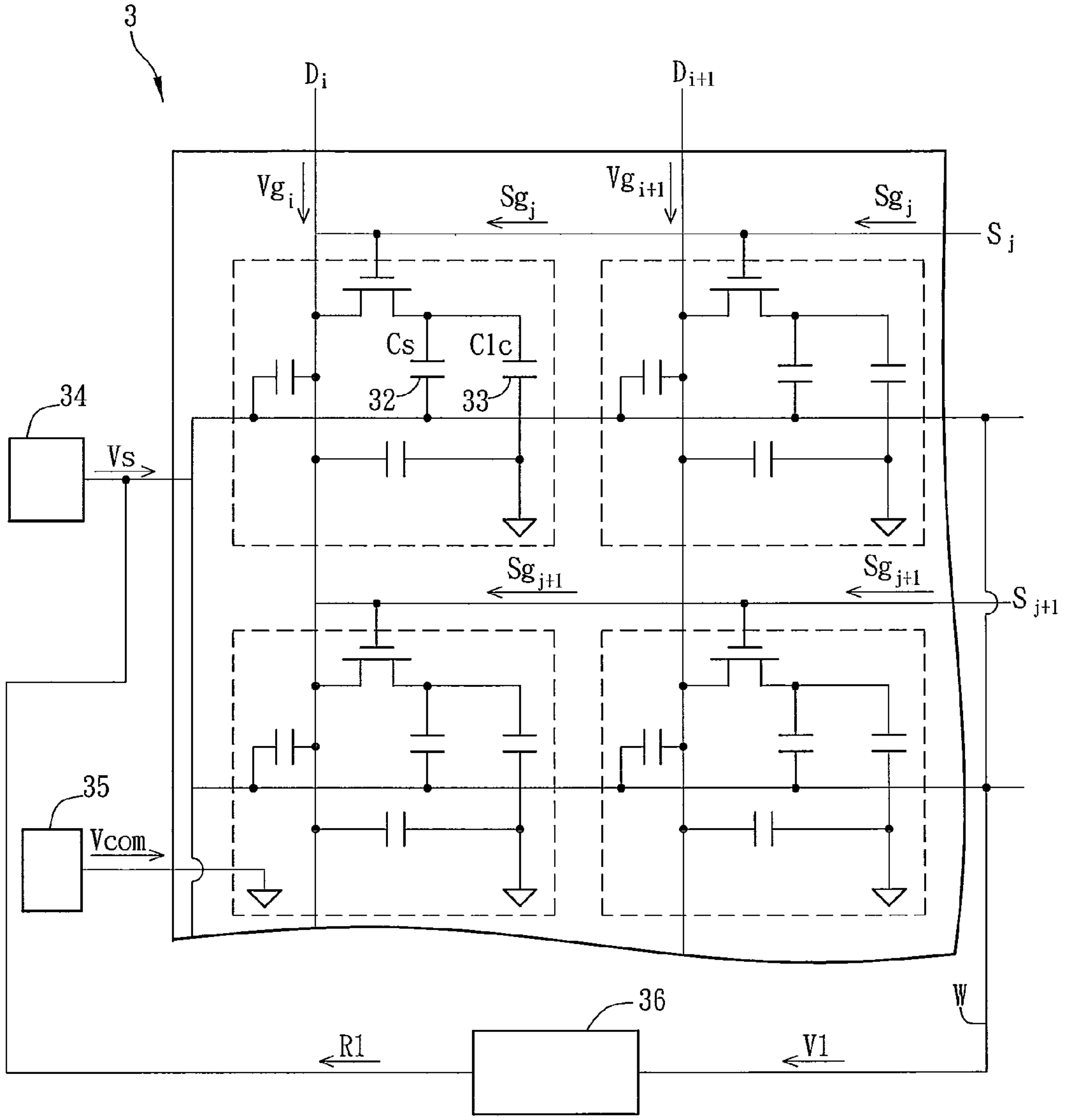
FIG. 4 is a schematic illustration of an equivalent circuit of an LCD panel according to a second embodiment of the invention.

FIG. 4 is a schematic illustration of an equivalent circuit of an LCD panel 3 according to a second embodiment of the invention. With reference to FIG. 4, the difference between the LCD panel 3 and the LCD panel 2 of the first embodiment is in that the reverse gain circuit 36 of the LCD panel 3 outputs a reverse gain voltage signal R1 to the storage capacitor electrode 32 so as to compensate the voltage variation of the storage capacitor voltage level signal Vs of the storage capacitor electrode 32.

Similarly, after compensating the storage capacitor voltage level signal Vs, the voltage variation of the common voltage level signal Vcom of the common electrode 33 can be compensated due to the electric charge transmission between the storage capacitance Cs and the liquid crystal capacitance Clc.

In addition, the storage capacitor electrode driving circuit can also include a storage capacitor electrode voltage driving unit and an adder (not shown) as that of the first embodiment. The adder is electrically connected to the storage capacitor electrode driving unit and the reverse gain circuit 36, so that it can adjust the storage capacitor voltage level signal Vs according to the reverse gain voltage signal R1.

Third Embodiment

Figure 5:
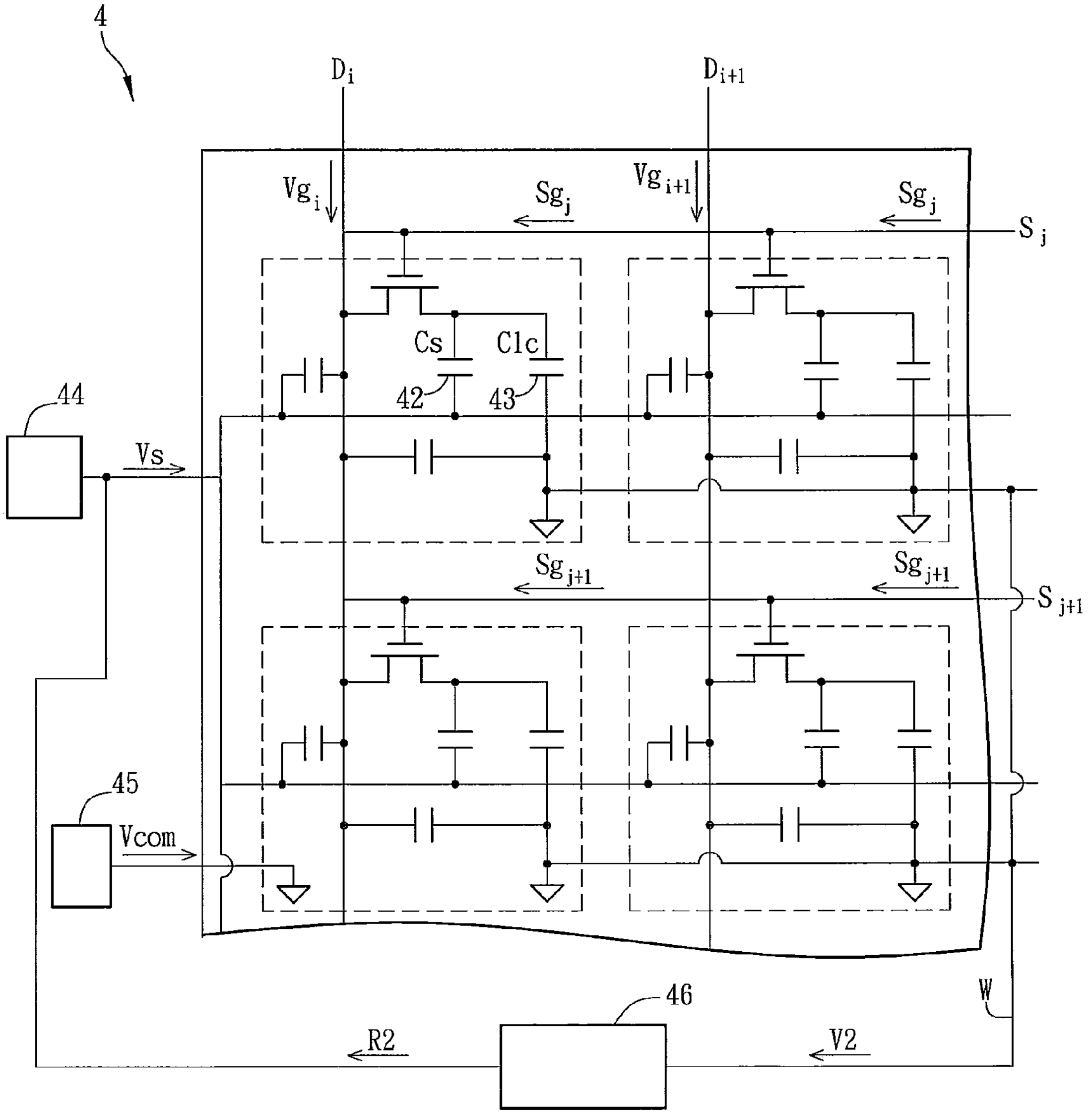
FIG. 5 is a schematic illustration of an equivalent circuit of an LCD panel according to a third embodiment of the invention.

FIG. 5 is a schematic illustration of an equivalent circuit of an LCD panel 4 according to a third embodiment of the invention. With reference to FIG. 5, the difference between the LCD panel 4 and the LCD panel 2 of the first embodiment is in that the reverse gain circuit 46 of the LCD panel 4 is electrically connected to the common electrode 43 and outputs a reverse gain voltage signal R2 to the storage capacitor electrode 42 according to the voltage signal V2 of the common electrode 43 so as to compensate the voltage variation of the storage capacitor voltage level signal Vs of the storage capacitor electrode 42.

Similarly, after compensating the storage capacitor voltage level signal Vs, the voltage variation of the common voltage level signal Vcom of the common electrode 43 can be compensated due to the electric charge transmission between the storage capacitance Cs and the liquid crystal capacitance Clc.

In addition, the storage capacitor electrode driving circuit can also include a storage capacitor voltage driving unit and an adder (not shown) as that of the second embodiment. The adder is electrically connected to the storage capacitor electrode driving unit and the reverse gain circuit 46, so that it can adjust the storage capacitor voltage level signal Vs according to the reverse gain voltage signal R2.

Figure 6:
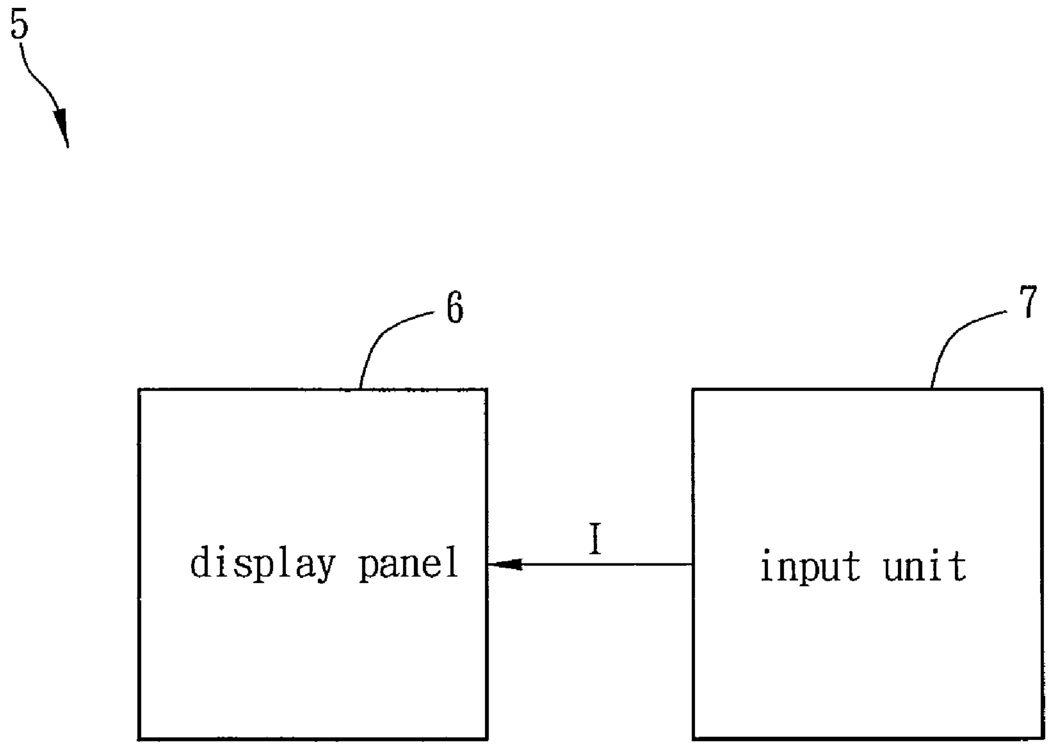
FIG. 6 is a schematic illustration of a display apparatus of the invention.

With reference to FIG. 6, a display apparatus 5 of the invention can be applied to a mobile phone, a digital camera, a personal digital assistant (PDA), a laptop computer, a desktop computer, a television, a vehicle display, a global positioning system (GPS), a flight display, a digital photo frame, or a portable DVD player. The display apparatus 5 includes a display panel 6 and an input unit 7. The input unit 7 is coupled to the display panel 6 for transmitting signals I to the display panel 6 for control the display panel 6 to display image.

Herein, the display panel 6 includes the LCD panel 2 of the first embodiment. In addition, the display panel 6 may include the LCD panel 3 or 4 of the previous mentioned second or third embodiment. The structures of the LCD panels 2, 3 and 4 are described in the above-mentioned embodiments, so the detailed descriptions thereof will be omitted.

In summary, the LCD panel of the invention has a reverse gain circuit electrically connected to the storage capacitor electrode. The reverse gain circuit can output a reverse gain voltage signal to the common electrode according to the voltage signal of the storage capacitor electrode so as to compensate the voltage variation of the common voltage level signal. The reverse gain voltage signal can not only compensate the voltage variation of the common voltage level signal, but also indirectly compensate the voltage variation of the storage capacitor voltage level signal.

In addition, the reverse gain circuit can output the reverse gain voltage signal to the storage capacitor electrode to compensate the voltage variation of the storage capacitor voltage level signal. Similarly, the reverse gain voltage signal can not only compensate the voltage variation of the storage capacitor voltage level signal, but also indirectly compensate the voltage variation of the common voltage level signal.

Furthermore, the reverse gain circuit can be electrically connected to the common electrode and output the reverse gain voltage signal to the storage capacitor electrode according to a voltage signal of the common electrode so as to compensate the voltage variation of the storage capacitor voltage level signal. The reverse gain voltage signal can not only compensate the voltage variation of the storage capacitor voltage level signal, but also indirectly compensate the voltage variation of the common voltage level signal.

Accordingly, the voltage variations of the common electrode and the storage capacitor electrode, which are caused by the writing of the image voltage signal, can be compensated by the reverse gain circuit. Thus, the lateral crosstalk issue of the LCD panel, which is caused by the voltage variations of the common electrode and the storage capacitor electrode, can be improved.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A liquid crystal display (LCD) panel, comprising:
a first substrate comprising a storage capacitor electrode;
a second substrate disposed oppositely to the first substrate and comprising a common electrode;
a common electrode driving circuit electrically connected with the common electrode and outputting a common voltage level signal to the common electrode; and
a reverse gain circuit electrically connected to the storage capacitor electrode through a connecting terminal and outputting a reverse gain voltage signal to the common electrode according to a voltage signal of the storage capacitor electrode.

2. The LCD panel according to claim 1, further comprising:
a storage capacitor electrode driving circuit electrically connected with the storage capacitor electrode and outputting a storage capacitor voltage level signal to the storage capacitor electrode.

3. The LCD panel according to claim 1, wherein the common electrode driving circuit comprises a common electrode driving unit and an adder, and the adder is electrically connected to the common electrode driving unit and the reverse gain circuit and adjusts the common voltage level signal according to the reverse gain voltage signal.

4. A liquid crystal display (LCD) panel, comprising:
a first substrate comprising a storage capacitor electrode;
a second substrate disposed oppositely to the first substrate and comprising a common electrode;
a storage capacitor electrode driving circuit electrically connected with the storage capacitor electrode and outputting a storage capacitor voltage level signal to the storage capacitor electrode; and
a reverse gain circuit electrically connected to the storage capacitor electrode through a connecting terminal and outputting a reverse gain voltage signal to the storage capacitor electrode according to a voltage signal of the storage capacitor electrode.

5. The LCD panel according to claim 4, further comprising:
a common electrode driving circuit electrically connected with the common electrode and outputting a common voltage level signal to the common electrode.

6. The LCD panel according to claim 4, wherein the storage capacitor electrode driving circuit comprises a storage capacitor electrode driving unit and an adder, and the adder is electrically connected to the storage capacitor electrode driving unit and the reverse gain circuit and adjusts the storage capacitor voltage level signal according to the reverse gain voltage signal.

7. A liquid crystal display (LCD) panel, comprising:
a first substrate comprising a storage capacitor electrode;
a second substrate disposed oppositely to the first substrate and comprising a common electrode;
a storage capacitor electrode driving circuit electrically connected with the storage capacitor electrode and outputting a storage capacitor voltage level signal to the storage capacitor electrode; and
a reverse gain circuit electrically connected to the common electrode through a connecting terminal and outputting a reverse gain voltage signal to the storage capacitor electrode according to a voltage signal of the common electrode.

8. The LCD panel according to claim 7, wherein the storage capacitor electrode driving circuit comprises a storage capacitor electrode driving unit and an adder, and the adder is electrically connected to the storage capacitor electrode driving unit and the reverse gain circuit and adjusts the storage capacitor voltage level signal according to the reverse gain voltage signal.

9. The LCD panel according to claim 7, further comprising:
a common electrode driving circuit electrically connected with the common electrode and outputting a common voltage level signal to the common electrode.

10. A display apparatus, comprising:
a display panel comprising:
a first substrate comprising a storage capacitor electrode,
a second substrate disposed oppositely to the first substrate and comprising a common electrode,
a common electrode driving circuit electrically connected with the common electrode and outputting a common voltage level signal to the common electrode, and
a reverse gain circuit electrically connected to the storage capacitor electrode through a connecting terminal and outputting a reverse gain voltage signal to the common electrode according to a voltage signal of the storage capacitor electrode; and
an input unit coupled to the display panel for transmitting signals to the display panel for control the display panel to display image.

11. The display apparatus according to claim 10 being applied to a mobile phone, a digital camera, a personal digital assistant (PDA), a laptop computer, a desktop computer, a television, a vehicle display, a global positioning system (GPS), a flight display, a digital photo frame, or a portable DVD player.

* * * * *